US007337962B2

(12) United States Patent
Do et al.

(10) Patent No.: US 7,337,962 B2
(45) Date of Patent: Mar. 4, 2008

(54) METHOD TO DETECT FALSE PURCHASES WITH A CONSUMER SERVICE DEVICE

(75) Inventors: Phuc Ky Do, Morrisville, NC (US); Justin Monroe Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/026,965

(22) Filed: Dec. 30, 2004

(65) Prior Publication Data

US 2006/0144933 A1 Jul. 6, 2006

(51) Int. Cl.
*G06K 15/00* (2006.01)

(52) U.S. Cl. .............. 235/383; 235/462.2; 235/462.23; 235/462.31

(58) Field of Classification Search ............. 235/462.2, 235/462.23, 462.31, 383, 379
See application file for complete search history.

(56) References Cited

U.S. PATENT DOCUMENTS

| | | | | |
|---|---|---|---|---|
| 5,747,784 | A | 5/1998 | Walter et al. | |
| 6,105,867 | A | 8/2000 | Shimizu et al. | |
| 6,354,498 | B1 | 3/2002 | Lutz | |
| 6,588,549 | B2 | 7/2003 | Wike, Jr. et al. | |
| 6,598,790 | B1 | 7/2003 | Horst | |
| 6,607,125 | B1 | 8/2003 | Clouser et al. | |
| 6,672,506 | B2 | 1/2004 | Swartz et al. | |
| 2002/0074402 | A1 | 6/2002 | Latimer et al. | |
| 2003/0001007 | A1 | 1/2003 | Lee et al. | |
| 2004/0000998 | A1 | 1/2004 | Karp | |
| 2005/0092834 | A1 * | 5/2005 | Latimer et al. | 235/383 |

* cited by examiner

*Primary Examiner*—Karl D. Frech
(74) *Attorney, Agent, or Firm*—Mark E. McBurney; Dillon & Yudell LLP

(57) ABSTRACT

A method, system and computer program product for detecting false purchases is disclosed. The method includes detecting a motion across a product identifier in a self-service terminal and monitoring for a product identifier. In response to failing to detect the product identifier, an alert signal is transmitted.

7 Claims, 8 Drawing Sheets

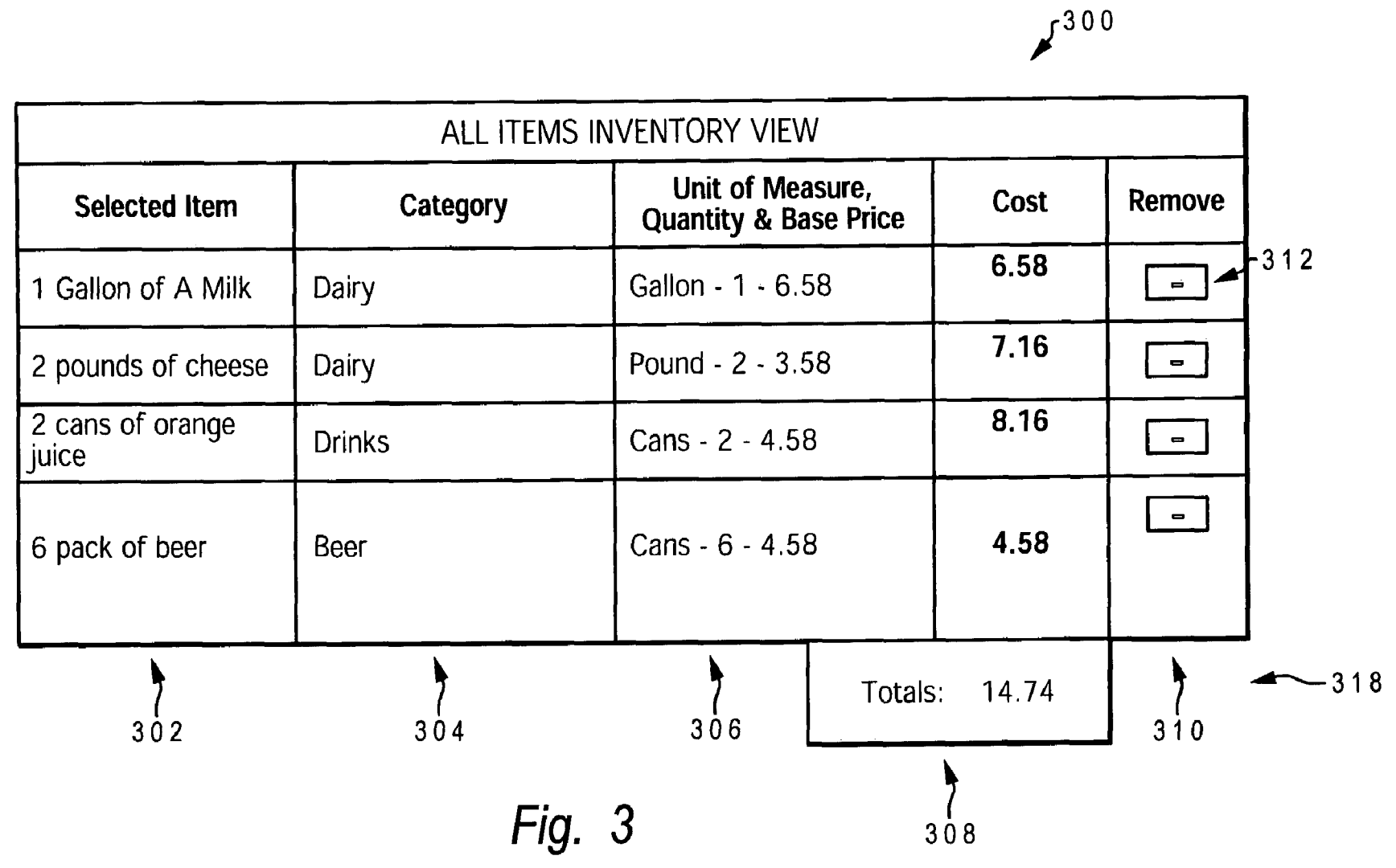

300

ALL ITEMS INVENTORY VIEW

| Selected Item | Category | Unit of Measure, Quantity & Base Price | Cost | Remove |
|---|---|---|---|---|
| 1 Gallon of A Milk | Dairy | Gallon - 1 - 6.58 | 6.58 | ▭ |
| 2 pounds of cheese | Dairy | Pound - 2 - 3.58 | 7.16 | ▭ |
| 2 cans of orange juice | Drinks | Cans - 2 - 4.58 | 8.16 | ▭ |
| 6 pack of beer | Beer | Cans - 6 - 4.58 | 4.58 | ▭ |

Totals: 14.74

302 304 306 308 310 312 318

*Fig. 3*

METHOD TO DETECT FALSE PURCHASES WITH A CONSUMER SERVICE DEVICE

BACKGROUND OF THE INVENTION

1. Technical Field

The present invention relates in general to the field of computers, and in particular to personal shopping devices. Still more particularly, the present invention relates to a method and system for preventing theft by signaling the status of a transaction on a personal shopping device.

2. Description of the Related Art

Shoplifting, while a perennial issue that currently costs American retailers $26 billion a year, is an area where retailers fear that the acquisition and deployment of personal shopping devices will lead to further complications and loopholes in security. Simply stated, many retailers fear that the adoption of personal shopping devices will lead to additional opportunity for theft and fraud, because fewer employees will be in contact with a purchase transaction and employee contact will be reduced to a smaller portion of the time during the transaction.

Prior art solutions to combat fraud become less appropriate in an personal shopping device-enabled environment. For high-cost items, the solution of having the store clerk remove a transmitter tag after purchase, makes little sense in an environment where machines are designed to remove a clerk from the purchase transaction. Similarly, the traditional solution of visually monitoring for theft by checking the contents of a shopping cart against a receipt is manpower intensive. Additionally, it interferes with the intended purpose of personal shopping devices: allowing the consumer a friendly and quick shopping experience; ideally one in which they never need to have their purchases checked by store personnel. Further assignment of personnel to monitor purchases on the personal shopping device as a solution to shoplifting suffers from the poor visibility (at a distance) of transaction status in prior-art personal shopping devices.

Prior art solutions do not include adequate measures for deterring attempts at false purchases, fraud, and theft in the use of personal shopping devices. As the number of persons interacting with the transaction is reduced in the prior art, prior art solutions increase the opportunity for theft, frauds and false purchase attempts. What is needed is a method to detect false purchases by both honest and dishonest consumers using a personal shopping device.

SUMMARY OF THE INVENTION

A method, system and computer program product for detecting false purchases is disclosed. The method includes detecting a motion across a product identifier in a self-service terminal and monitoring for a product identifier. In response to failing to detect the product identifier, an alert signal is transmitted.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIG. 3 illustrates an exemplary graphical user interface that tracks items that have been previously selected by a shopper;

DETAILED DESCRIPTION OF THE PREFERRED EMBODIMENT

Figure 1:
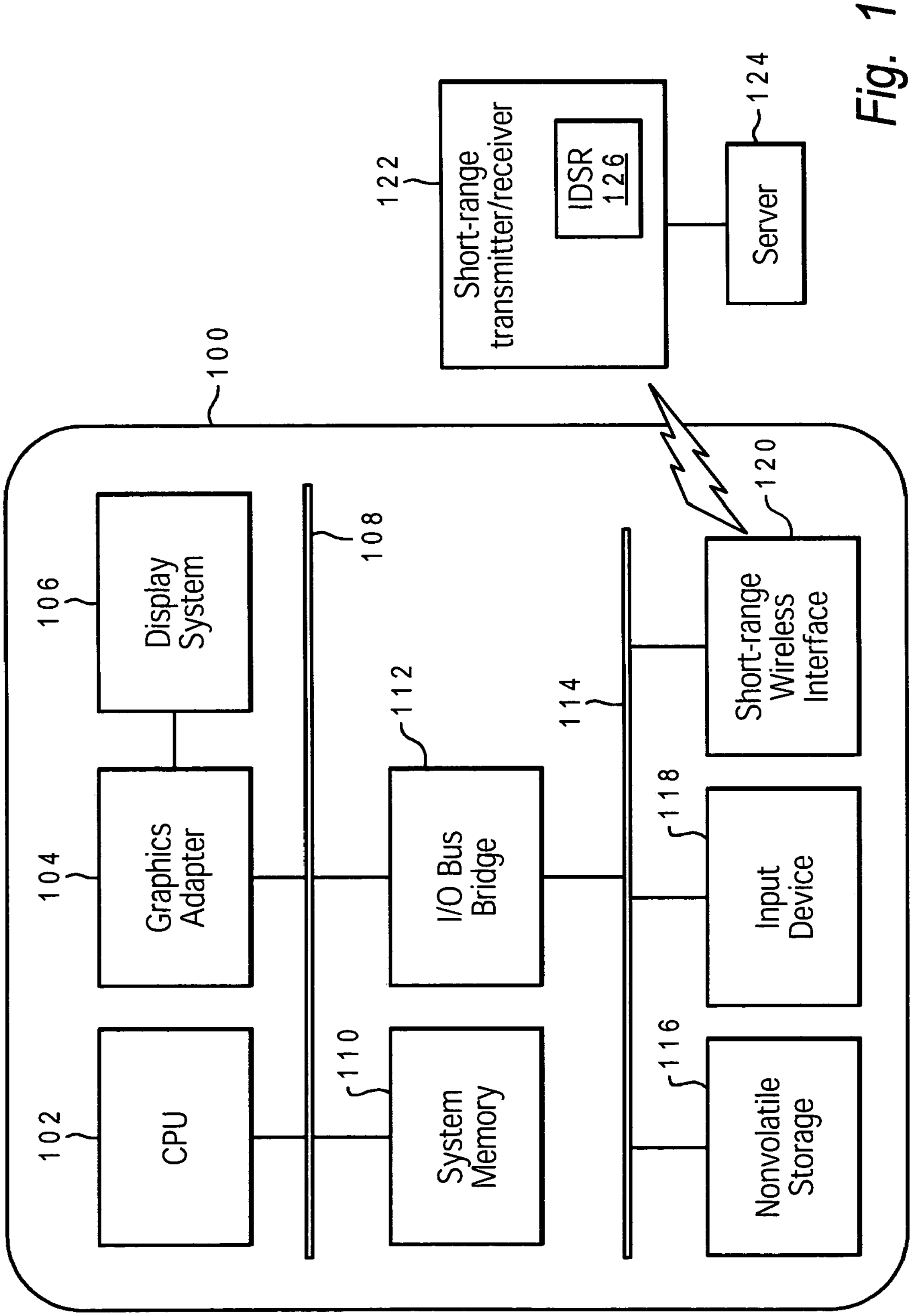
FIG. 1 illustrates an exemplary computer system in which the present invention can be implemented, either as a wireless device for receiving a marketing message, a transmitter/receiver for communicating with the wireless device, and/or as a server that exchanges data with the wireless device via the transmitter/receiver.

With reference now to the figures, and in particular with reference to FIG. 1, there is depicted a block diagram of an exemplary data processing system in which a preferred embodiment of the present invention may be implemented. Data processing system 100 includes a central processing unit (CPU) 102, which is connected to a system bus 108. In the exemplary embodiment shown in FIG. 1, data processing system 100 includes a graphics adapter 104, also connected to system bus 108, for providing user interface information to a display system 106. Display system 106 may include multiple display units. Display units will, in various embodiments, include systems for transmitting light, such as a liquid crystal display or light-emitting diode bar, and may include a speaker for emitting audible signals.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, as well as a bar code or similar reader or a card reader or other similar device, is connected to I/O bus 114.

Data processing system 100 also includes a wireless interface 120. Wireless interface 120 is an interface that permits data processing system 100 to wirelessly communicate, preferably via a radio carrier signal, with another data processing system, such as a short-range transmitter/receiver system 122, which also communicates with a server 124.

Short-range transmitter/receiver 122 may also include an IDentification Signal Receiver (IDSR) 126. IDSR 126 is a logic (hardware and/or software) that receives and processes an identification signal from a wireless computer such as a Personal Shopping Device (PSD).

In a preferred embodiment, the features shown for data processing system 100 are used by the PSD, while the short-range transmitter/receiver 122 uses all features shown for data processing system 100 except for the graphics adapter 104 and display 106, and the server 124 has all features shown for data processing system 100 except for the short-range wireless interface, since server 124 and short-range transmitter/receiver 122 preferably are able to communicate across long distances.

The exemplary embodiment shown in FIG. 1 is provided solely for the purposes of explaining the invention. Those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

Figure 2B:
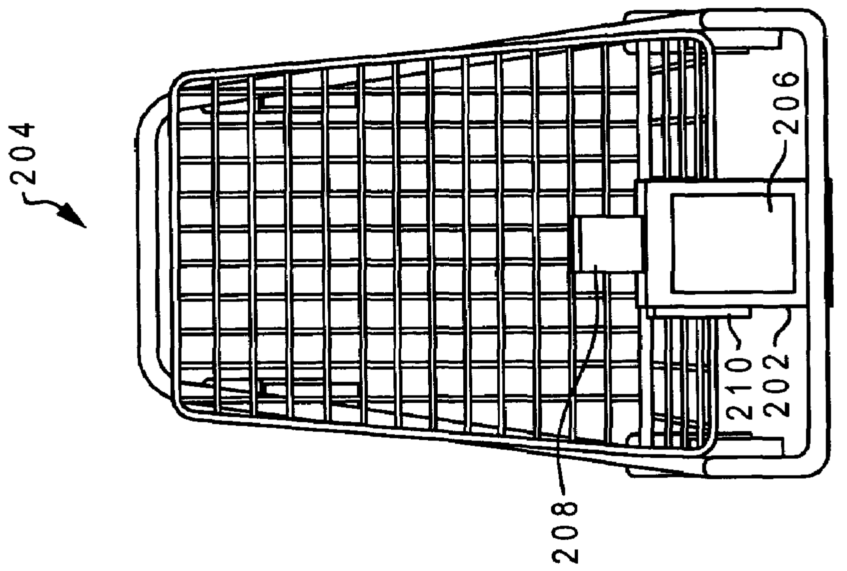
FIGS. 2A and 2B depict an exemplary environment in which the wireless device is mounted to a shopping cart in a store.
Figure 2A:
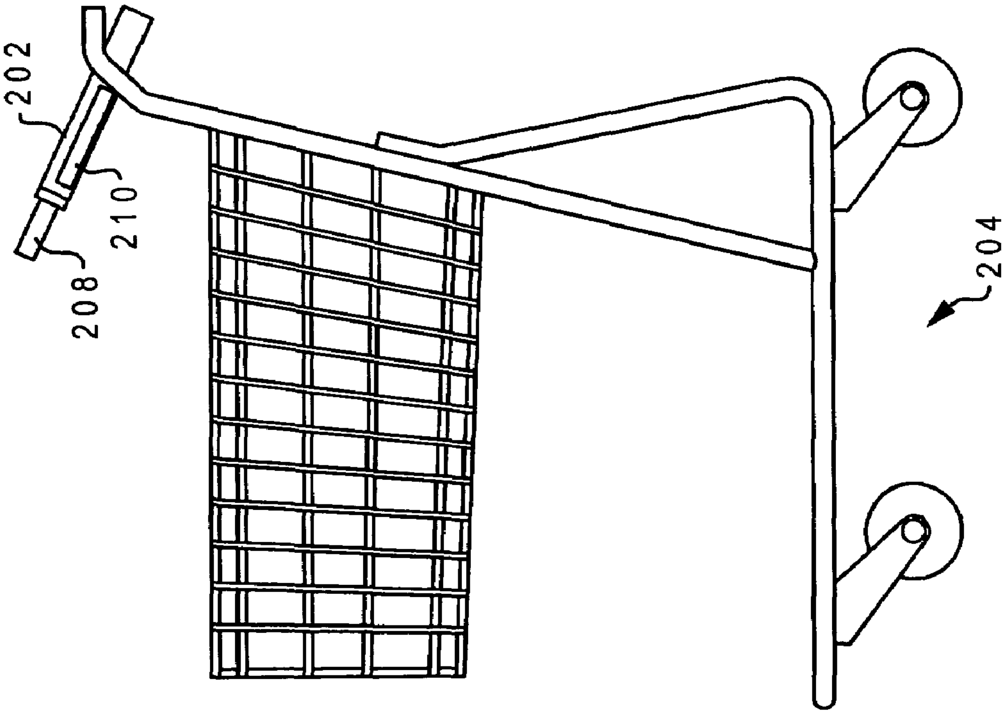

Referring now to FIGS. 2A-2B, an exemplary use of data processing system 100 is shown. Data processing system 100 is depicted as a Personal Shopping Device (PSD) 202, which is attached to a shopping cart 204, preferably in a manner that is semi-fixed (i.e., requiring tools to remove PSD 202 from shopping cart 204, in order to prevent the theft of PSD 202). As seen in the top view of FIG. 2B, PSD 202 has an active viewing screen 206, which displays a Graphical User Interface (GUI) for displaying data, as well as for receiving inputs (preferably via a touch-screen capability) into PSD 202.

An exemplary use of PSD 202 may be in a retail establishment. Prior to placing an item into their shopping cart 204 as a purchase, a shopper reports the product to the PSD 202 using a bar code reader/magnetic card/smartcard reader module 210, which reads a Universal Product Code (UPC) bar code (or another product identifier) from the product selected by the shopper and records the product in PSD 202. The shopper then places the item into their shopping cart 204. In addition to bar code, magnetic cards, and smartcards, some embodiments of bar code reader/magnetic card/smartcard reader module 210 may be configured to read other forms of non-volatile memory devices, such as compact flash, memory keys, or memory sticks. The PSD 202 stores all items that have been scanned and placed in the shopping cart 204 into a list. In the preferred embodiment, each product identification reader also has the capability to detect that it is in range of a product. For example a barcode scanner may be able to detect that a product is being placed in range of its scanner head. A magnetic card reader will be able to detect that a motion took place at close range. The benefit of this capability will be made clear. When the customer checks out, the checker simply downloads the list (with prices) to conclude a shopping transaction. Display system 106 includes both viewing screen 206 and a secondary display unit 208, which may include a light emitting diode bar for emitting signal lights and a speaker system for emitting audible signals. Viewing screen 206 can also serve as input device 118 by serving as a touch screen.

Turning now to FIG. 3, an exemplary graphical user interface that tracks items that have been previously selected by a shopper is depicted. FIG. 3 illustrates an all items inventory view 300 of items purchased by a user of the personal shopping device 202. All items inventory view 300 includes, for each of several items, a selected item column 302, which lists the item under consideration. Category and subcategory column 304 lists the type of item for each item. Cost column 306 provides a price for the selected item, including any applicable loyalty discounts or coupons. Remove column 310 provides remove buttons 312 for canceling transactions.

All items inventory view 300 additionally includes a totals line 318 with a total for cost column 308.

Figure 4:
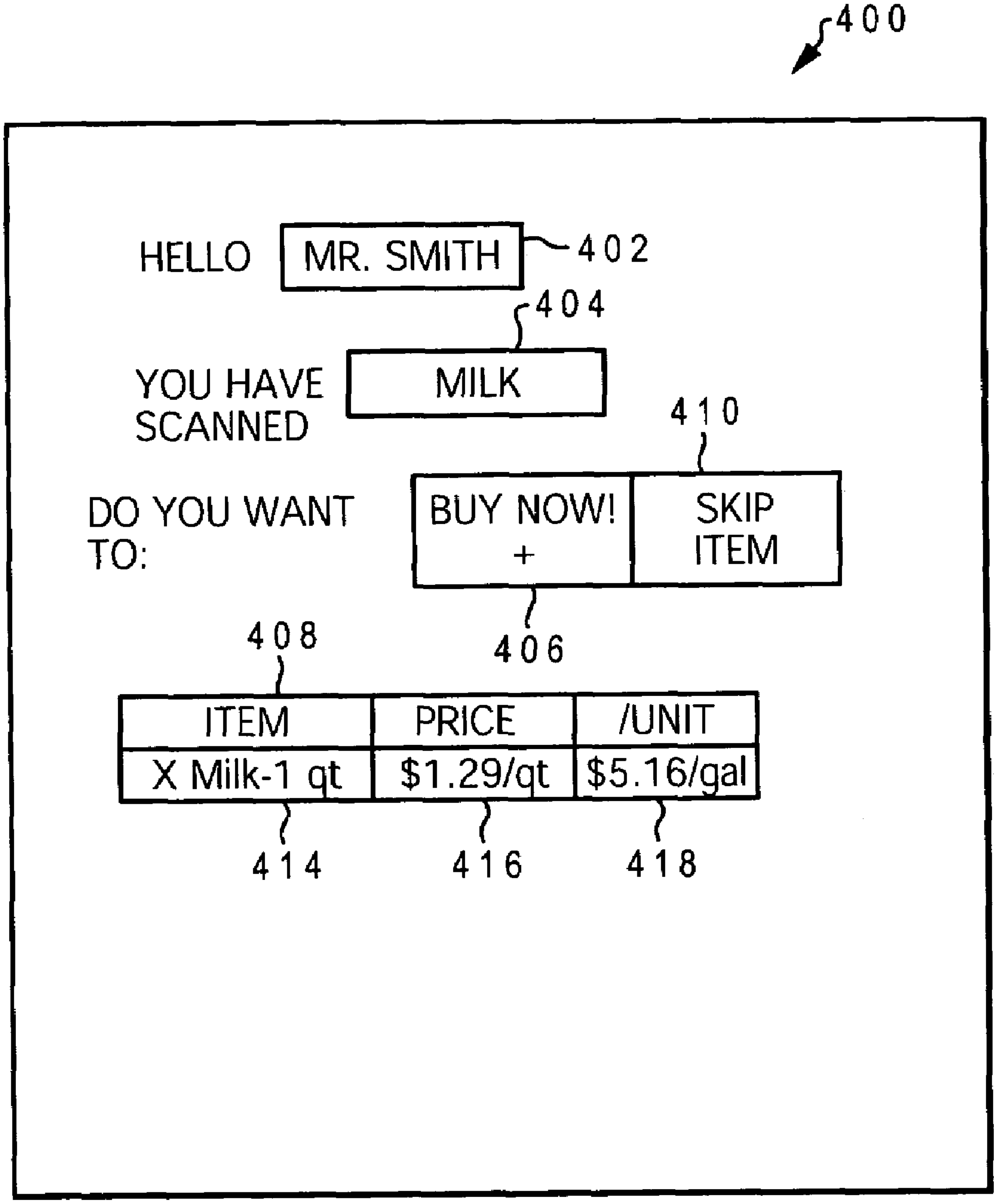
FIG. 4 depicts an exemplary Graphical User Interface (GUI) on the wireless device offering a price check to the shopper with an opportunity to purchase an item.

Referring now to FIG. 4, an exemplary Graphical User Interface (GUI) on the wireless device offering a price check to the shopper with an opportunity to purchase an item is illustrated. The depicted graphical user interface includes a price view 400, which would be activated by scanning an item's UPC signal or radio tag with bar code reader/magnetic card/smartcard reader module 210. Price view 400 is a means for providing a user with pricing information and the opportunity to commit to purchase an item.

Price view 400 includes an address line 402 for identifying a user, an item line 404 for identifying the item subject to price check, a buy button 406 for providing the user with the opportunity to purchase the item, a price box 408 for providing quantitative price data and a skip item button 410, for declining a transaction. Within price box 408, several different items of information are listed.

For the example shown with respect to FIG. 4, the item subject to price comparison is a quart of milk. Items that will be listed in price box 408 include an item description 414, which provides the identity of the listed item. Similarly price column 416 displays a base price of an item. Per unit price column 418 displays a price per unit.

Figure 5:
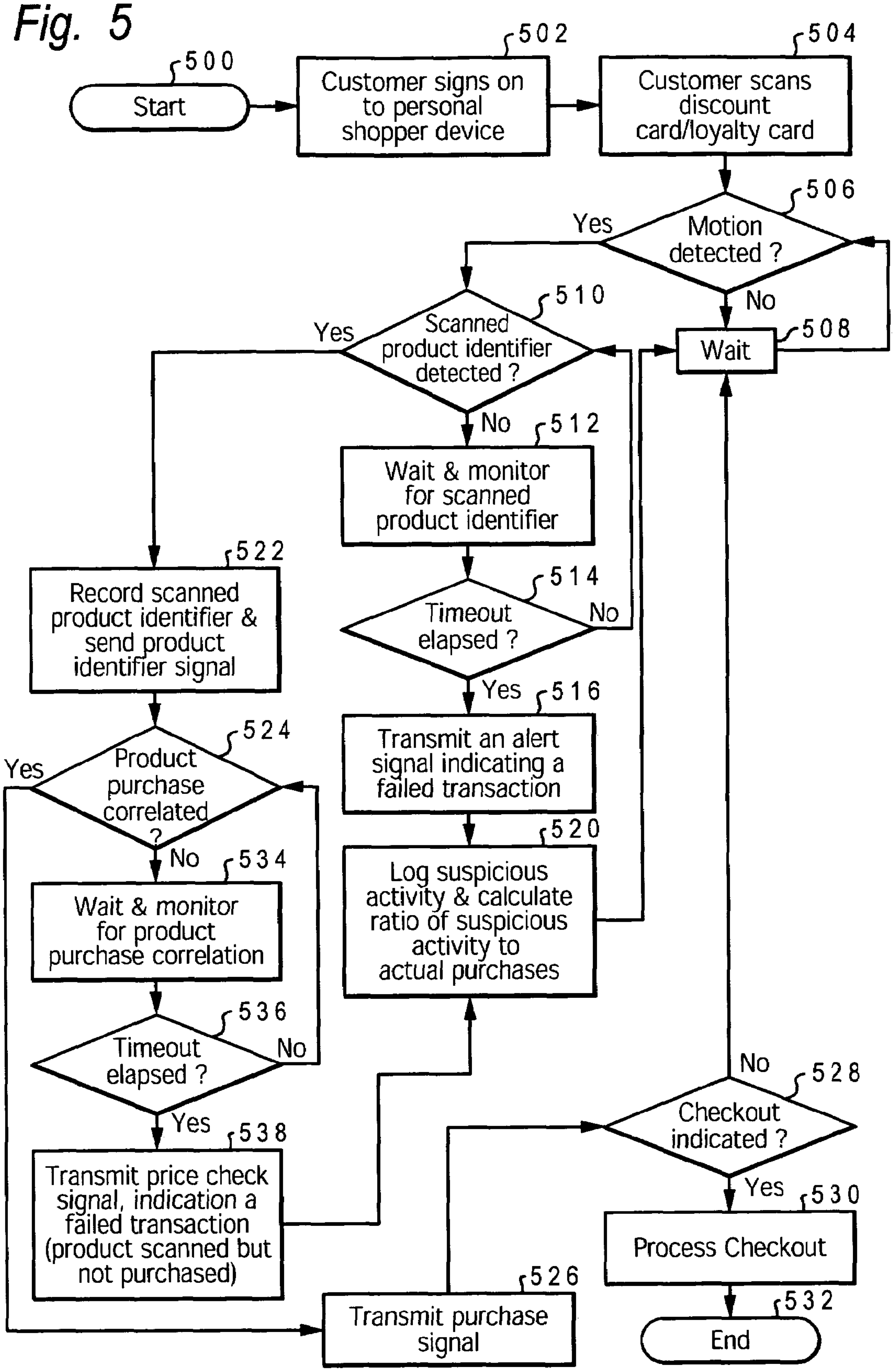
FIG. 5 is a flow chart of steps taken in a preferred embodiment of the present invention for providing appropriate alerts to detect and deter theft.

Turning now to FIG. 5, a flow chart of steps taken in a preferred embodiment of the present invention for providing appropriate alerts to detect and deter theft is depicted. The process starts at step 500. The process then moves to step 502. At step 502, a customer signs on to a personal shopping device 202. The process then moves to step 504, which depicts a customer scanning a discount card or loyalty card through bar code reader/magnetic card/smartcard reader module 208. The process next proceeds to step 506, at which personal shopping device 202 (or peripheral) determines whether motion has been detected in the vicinity of barcode reader/magnetic card/smartcard reader module 210. If motion has not been detected in the vicinity of barcode reader/magnetic card/smartcard reader module 210, then the process next proceeds to step 508 which depicts personal shopping device 202 waiting. The process then returns to step 506.

At step 506, if motion is detected in the vicinity of barcode reader/magnetic card/smartcard reader module 210, then the process next moves to step 510, which depicts personal shopping device 202 (or peripheral) determining whether a product identifier (e.g. a UPC) has been detected. A product identifier will be detected whenever barcode reader/magnetic card/smartcard reader module 210 reads and identifies a product code from a product. If a product identifier is not detected, the process next moves to step 512, which depicts personal shopping device 202 waiting and monitoring barcode reader/magnetic card/smartcard reader module 210 for to detect a product identifier. The process then moves to step 514, which depicts personal shopping device 202 determining whether a timeout has lapsed. If a timeout has lapsed, then the process next proceeds to step 516, which depicts personal shopping device transmitting an alert signal indicating a failed transaction. That is, a transaction that appeared to be an attempt at a gathering a product identifier, but no product identifier was detected. In a preferred embodiment, an alert signal may selectively include a wireless signal from short-range wireless interface 120 over a radio frequency carrier to short-range transmitter receiver 122 and a combination of an emission a particular pulse and color, such as a single yellow flash of visible light from secondary display unit 208 and an audible signal, such as a dinging bell sound, from secondary display unit 208. This particular signal is not possible to send unless the hardware supports detection of attempted use. This capability is not required for the remaining signals nor is it required for a useful embodiment.

The process next proceeds to step 520 in which personal shopping device 202 or server 124 logs suspicious activity and calculates a ratio of suspicious activity to any actual purchases made by the user personal shopping device 202. The process then returns to step 508, which is described above.

Returning to step 514, if no timeout has lapsed, then the process next returns to step 510. At step 510, if a product identifier has been detected, then the process proceeds to step 522. Step 522 depicts personal shopping device 202 recording the detected product identifier in step 510 and sending a product identification signal. A product identification signal will be intended to inform machines or persons observing the product identification signal that an item has been successfully identified by a reader. In a preferred embodiment, a product identification signal will preferably include the transmission of a radio frequency signal from short range wireless interface 120, to short-range transmitter receiver 122 as well as the illumination of secondary display 208, examples of which might include a series of two yellow pulses across the secondary display unit 208. Alternatively, an audible chime could be used as a product identification signal.

The process then proceeds to step 524, which depicts personal shopping device 202 determining whether a product is purchased, such as by actuating the buy button 406 in price view 400, has been correlated to the product identification detected in step 510. If personal shopping device 202 has successfully correlated a product to purchase to the product identifier detected in 510, then the process next moves to step 526. At step 526, personal shopping device 202 transmits a purchase signal. In a preferred embodiment, a purchase signal includes a radio frequency signal from short-range wireless interface 120 to short-range transmitter receiver 122 as well as a combination of an audible beeping sound and a green illumination of secondary display 208.

The process next movess to step 528. At step 528, personal shopping device 202 whether check-out is indicated. If check-out is not indicated, then the process returns to step 508, which is described above. If check-out is indicated, then the process moves to step 530, which depicts personal shopping device 202 processing check-out. The process then ends at step 532.

Returning to step 524, if personal shopping device has not correlated a product to purchase to the scan product identification recorder in step 522, then the process next moves to step 534. At step 534, personal shopping device waits and monitors the result of price view 400 for a product purchase correlation to the product identification recorded in step 522. The process next moves to step 536. At step 536, personal shopping device determines if a timeout has lapsed. If, at step 536, a timeout has not lapsed, then the process returns to step 524, which is described above. If a timeout has lapsed, then the process proceeds to step 538, which depicts personal shopping device 202 transmitting a price check signal indicating that a product identifier was detected, but was not purchased. A price check signal can take the form of a brief audible alarm and red light transmitted from secondary display unit 208 and can also include transmission of a radio frequency signal of a short range wireless interface 120 to short range transmitter receiver 122.

Figure 6:
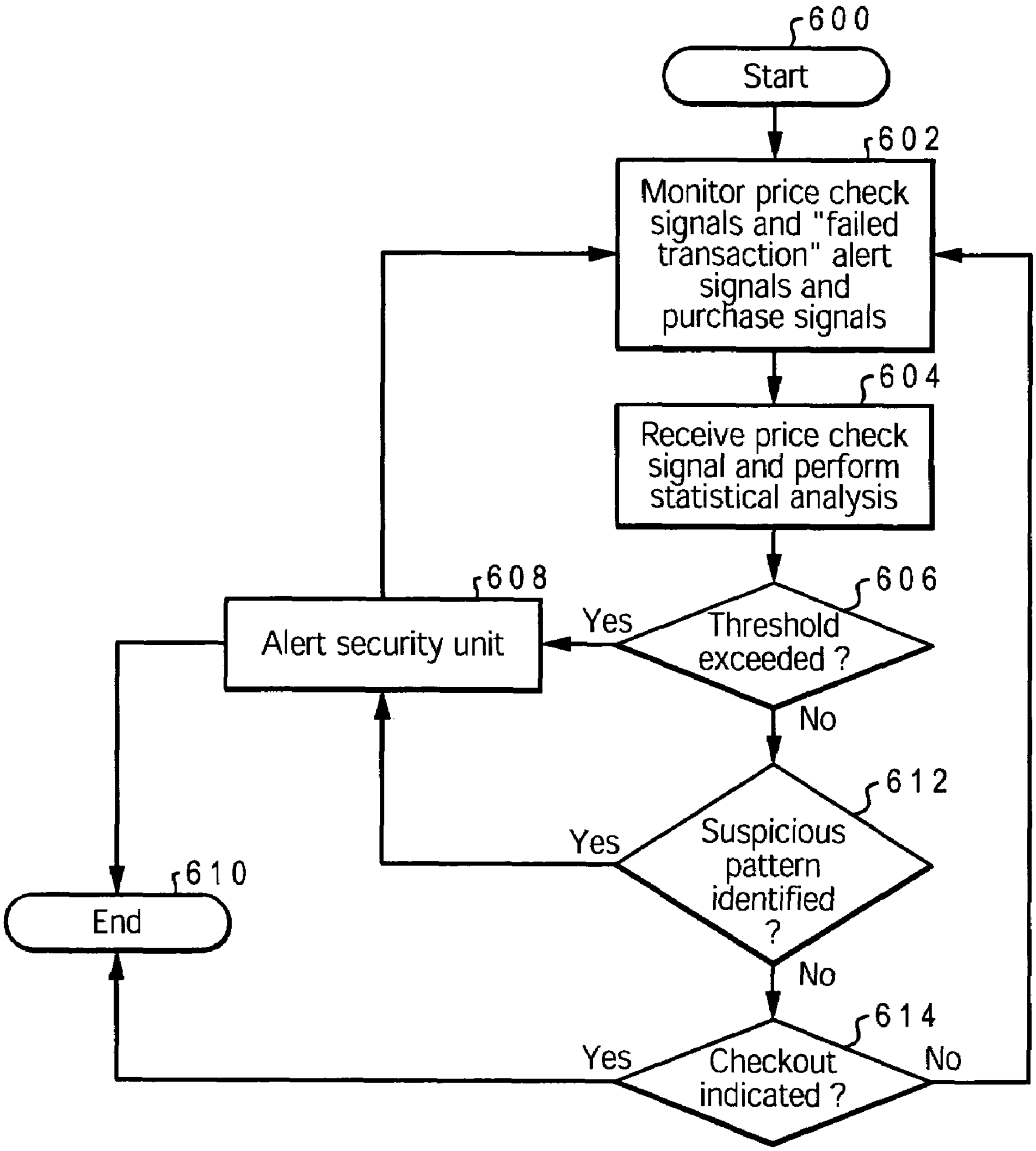
FIG. 6 is a flow chart of steps taken in a preferred embodiment of the present invention to use notices to detect false purchases.

Referring now to FIG. 6, a flow chart of steps taken in a preferred embodiment of the present invention to use notices to detect false purchases is illustrated. While the process of FIG. 6 is illustrated with respect to a personal shopping device 202, the steps of the process can also be performed by server 124 with respect to signals received by server 124 from personal shopping device 202.

The process starts at step 600, which will typically correspond to activation of a security routine. The process then moves to step 602, which depicts personal shopping device 202 monitoring transmissions that personal shopping device 202 sends from short-range wireless interface 120 for alert signals indicating a failed transaction, purchase signals indicating a purchase, and price check signals indicating that a product identifier was detected but no purchase was made. The process next proceeds to step 604. At step 604, personal shopping device 202 sends a price check signal and performs a statistical analysis of alert signals indicating a possible fake wave, purchase signals indicating a purchase, and price check signals indicating that a product identifier was detected but no purchase was made, which it has recently received from the current user.

The process then moves to step 606, which depicts personal shopping device 202 determining whether ratio of alert signals indicating a possible fake wave and price check signals indicating that a product identifier was read, but no purchase was made to purchase signals indicating a purchase has exceeded a selectable threshold value. In an alternative embodiment, personal shopping device 202 may determine whether the number of alert signals indicating a fake wave and price check signals indicating that a product identifier was read but no purchase was made has exceeded a selectable threshold value. If either number has exceeded a threshold value, then the process proceeds to step 608. At step 608, personal shopping device 202 alerts a security unit to begin monitoring a user that may be committing fraud. A security unit could include a process on server 124 or could include actual security personnel. The process then ends at step 610.

Returning to step 606, if personal shopping device 202 determines that either previously discussed number has not exceeded a threshold value, then the process proceeds to step 612, which personal shopping device 202 determining whether a suspicious activity pattern exists. If a suspicious activity pattern exists, then the process next moves to step 608, which is described above. If no suspicious activity pattern exists, then the process next moves to step 614. At step 614, personal shopping device 202 determines whether checkout is indicated. If checkout is indicated, then the process ends at step 610. If checkout is not indicated, then the process returns to step 602, which is described above.

Figure 7:
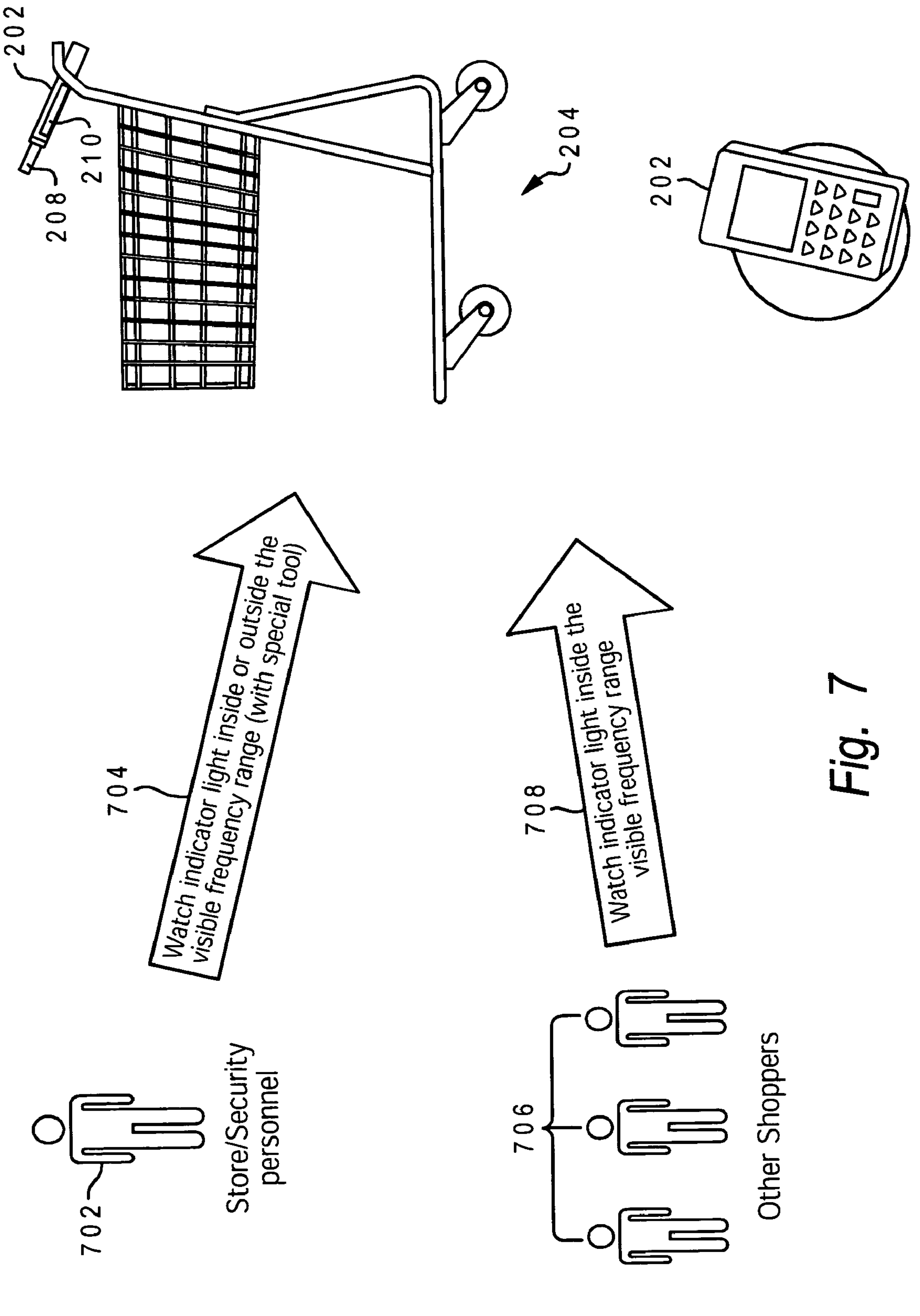
FIG. 7 illustrates possible interactions of security personnel and other persons using the preferred embodiment with signals produced by the preferred embodiment.

Turning now to FIG. 7, possible interactions of security personnel and other persons using the preferred embodiment with signals produced by the preferred embodiment are depicted. Two possible uses of the preferred embodiment are indicated. In the first, indicated as step 704, store personnel, security personnel 702, or an intelligent automated system monitor an indicator light or transmission (with a detector, such as server 124) for suspicious activity. This monitoring can be achieved by watching secondary display unit 208 on personal shopping device 202 for signals indicating the whether items being placed in a cart are actually being purchased by a user.

In a second scenario, indicated as step 708, other shoppers 706, having become familiar with the common tones or lights emitted by honest purchases during their own use of the system, may detect and report suspicious activity to store personnel or security personnel 702. This monitoring may be achieved by watching secondary display unit 208 on personal shopping device 202 for signals indicating whether items being placed in a cart are acutlaly being purchased by a user.

Figure 8:
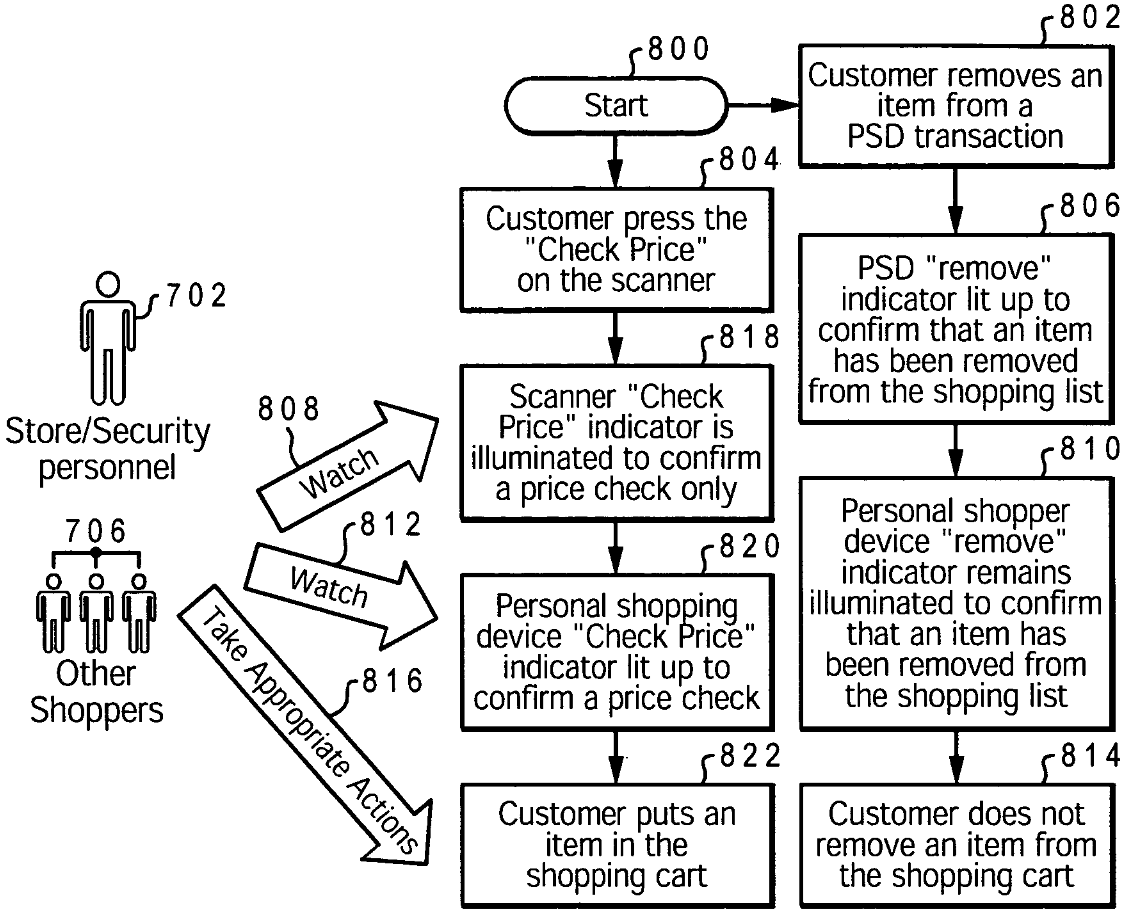
FIG. 8 depicts interaction of customers, security personnel and other persons using the preferred embodiment with signals produced by the preferred embodiment to prevent theft.

Referring now to FIG. 8, interaction of customers, security personnel and other persons using the preferred embodiment with signals produced by the preferred embodiment to prevent theft is illustrated. The process starts at step 800, which corresponds to activation of personal shopping device 202. The process can then proceed along two different tracks. Along the first track, the process next proceeds to step 804, which depicts a customer checking a price of an item with personal shopping device 202 but indicating a decision not to buy the item, such as by pressing skip item button 410. The process then moves to step 818. At step 818, personal shopping device 202 provides a 'check price' indicator, such as the price check signal, described above. Other shoppers 706 or store personnel or security personnel 702 can respond by monitoring 808 the actions of the shopper.

The process then moves to step 820. At step 820, secondary display device 208 can remain illuminated with a check price indicator such as a scan signal to continue to attract attention until another transaction is undertaken. Other shoppers 706 or store personnel or security personnel 702 can respond by monitoring 812 the actions of the shopper. Then, in our example scenario, the process next proceeds to step 822, at which the customer, who has purchased nothing, places an item in the shopping cart 204 as though it had been purchased. Other shoppers 706 or store personnel or security personnel 702 can take appropriate action 816 by politely informing the shopper that he has left an item in the cart that he has not purchased. The process then ends at step 824.

Alternatively, the process can proceed from step 800 to step 802, which depicts a customer removing an item from a transaction, such as by pressing remove button 312. The process then moves to step 806. At step 806, personal shopping device 202 provides a 'removed item' indicator, such which may be the same as or different from the scan signal, described above. Other shoppers 706 or store personnel or security personnel 702 can respond by monitoring 808 the actions of the shopper.

The process then moves to step 810. At step 810, secondary display device 208 can remain illuminated with a remove indicator such as a scan signal to continue to attract attention until another transaction is undertaken. Other shoppers 706 or store personnel or security personnel 702 can respond by monitoring 812 the actions of the shopper. Then, in our example scenario, the process next proceeds to step 814, at which the customer, who has removed an item from a transaction, fails to remove an item from the shopping cart 204 as though it had been purchased. Other shoppers 706 or store personnel or security personnel 702 can take appropriate action 816 by politely informing the shopper that he has left an item in the cart that he has not purchased. The process then ends at step 824

The present invention solves the problem of the prior art by providing a method to detect false purchases, fraud, and shoplifting. The preferred embodiment provides notification of suspicious activity to monitoring devices, store or security personnel, or other shoppers, whenever suspicious activity is taking place. The preferred embodiment makes suspicious activity highly visible, in the hopes of both deterring and detecting suspicious activity to prevent loss.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method, comprising:

detecting a motion across a product identifier in a self-service terminal;

monitoring for a product identifier;

in response to failing to detect the product identifier, transmitting an alert signal indicating a failed transaction;

in response to detecting said product identifier, recording said product identifier on a personal shopping device;

in response to recording said product identifier on said personal shopping device, sending a product identification signal, indicating a price check, from said personal shopping device;

correlating an initiation of a purchase transaction to said product identifier; and in response to correlating said product identifier to said initiation, transmitting a product purchased signal from said personal shopping device.

2. The method of claim 1, further comprising transmitting a product identified signal from said personal shopping device in response to a product identification that is not correlated to a purchase transaction within a predetermined time.

3. The method of claim 1, further comprising:

identifying suspicious activity as being a failure to correlate said product identifier to said initiation of a purchase transaction; and logging said suspicious activity.

4. The method of claim 3, further comprising:

in response to said alert signal and said product identified signal being repeatedly generated to create respective multiple alert signals and product identified signals, calculating a ratio of a sum of said product identified signals and said alert signals to a quantity of said product purchased signals.

5. The method of claim 4, further comprising alerting a security unit when said ratio exceeds a threshold value.

6. The method of claim 2, further comprising:

identifying a pattern in a relationship between a number of said product identified signasl, a number of said failure signals, and a number of said product purchased signals; and alerting a security unit to said pattern.

7. The method of claim 1, wherein said step of transmitting said product purchased from said personal shopping device further comprises transmitting one of a group consisting of a first audible signal, a first color of light outside the visible spectrum from an illumination unit, a first color of visible light from said illumination unit, and a first radio-frequency signal.

* * * * *